US008219303B2

(12) United States Patent
Schwenke et al.

(10) Patent No.: US 8,219,303 B2
(45) Date of Patent: Jul. 10, 2012

(54) METHOD FOR OPERATING AN INTERNAL COMBUSTION ENGINE FOR A HYBRID POWERTRAIN SYSTEM

(75) Inventors: R. Travis Schwenke, Springboro, OH (US); Todd D. Brandel, Mears, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 807 days.

(21) Appl. No.: 12/253,952

(22) Filed: Oct. 18, 2008

(65) Prior Publication Data

US 2009/0118914 A1    May 7, 2009

Related U.S. Application Data

(60) Provisional application No. 60/985,642, filed on Nov. 5, 2007.

(51) Int. Cl.
G06F 19/00 (2011.01)
G06G 7/70 (2006.01)

(52) U.S. Cl. ...................................................... 701/111
(58) Field of Classification Search .................... 701/52, 701/53, 54, 104, 105, 112, 113, 111; 903/904, 903/905
See application file for complete search history.

(56) References Cited

U.S. PATENT DOCUMENTS

| 5,934,395 | A | * | 8/1999 | Koide et al. ............... 180/65.235 |
|---|---|---|---|---|
| 6,307,277 | B1 | | 10/2001 | Tamai et al. |
| 6,832,148 | B1 | | 12/2004 | Bennett |
| 6,868,318 | B1 | | 3/2005 | Cawthorne |
| 7,154,236 | B1 | | 12/2006 | Heap |
| 2003/0217876 | A1 | | 11/2003 | Severinsky et al. |
| 2005/0076958 | A1 | | 4/2005 | Foster |
| 2005/0077867 | A1 | | 4/2005 | Cawthorne |
| 2005/0077877 | A1 | | 4/2005 | Cawthorne |
| 2005/0080523 | A1 | | 4/2005 | Bennett |
| 2005/0080527 | A1 | | 4/2005 | Tao |
| 2005/0080535 | A1 | | 4/2005 | Steinmetz |
| 2005/0080537 | A1 | | 4/2005 | Cawthorne |
| 2005/0080538 | A1 | | 4/2005 | Hubbard |
| 2005/0080539 | A1 | | 4/2005 | Hubbard |
| 2005/0080540 | A1 | | 4/2005 | Steinmetz |
| 2005/0080541 | A1 | | 4/2005 | Sah |
| 2005/0182526 | A1 | | 8/2005 | Hubbard |
| 2005/0182543 | A1 | | 8/2005 | Sah |
| 2005/0182546 | A1 | | 8/2005 | Hsieh |

(Continued)

FOREIGN PATENT DOCUMENTS

WO    2004/067949 A1    8/2004

*Primary Examiner* — Mary Cheung
*Assistant Examiner* — Kyle K Tsui

(57) ABSTRACT

A hybrid powertrain system includes an internal combustion engine operatively connected to a second torque machine to transmit torque to an output member. A method for operating the hybrid powertrain system includes monitoring an operator torque request, determining an output torque command based upon the operator torque request, commanding a transition between an engine-off state and an engine-on state, monitoring an engine crank angle, spinning the engine unfueled, estimating cylinder pressure based upon the engine crank angle during the spinning of the engine, predicting a cylinder pulse torque based upon the cylinder pressure, determining a cancellation torque for the second torque machine based upon the predicted cylinder pulse torque, and controlling motor torque output from the second torque machine based upon the cancellation torque and the output torque command.

8 Claims, 6 Drawing Sheets

U.S. PATENT DOCUMENTS

| | | |
|---|---|---|
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0232444 A1 | 10/2007 | Adachi |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1* | 11/2008 | Snyder .......................... 701/104 |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |

| | | | | | | |
|---|---|---|---|---|---|---|
| 2009/0118929 | A1 | 5/2009 | Heap | 2009/0118946 A1 | 5/2009 | Heap |
| 2009/0118930 | A1 | 5/2009 | Heap | 2009/0118947 A1 | 5/2009 | Heap |
| 2009/0118931 | A1 | 5/2009 | Kaminsky | 2009/0118948 A1 | 5/2009 | Heap |
| 2009/0118932 | A1 | 5/2009 | Heap | 2009/0118949 A1 | 5/2009 | Heap |
| 2009/0118933 | A1 | 5/2009 | Heap | 2009/0118950 A1 | 5/2009 | Heap |
| 2009/0118934 | A1 | 5/2009 | Heap | 2009/0118951 A1 | 5/2009 | Heap |
| 2009/0118935 | A1 | 5/2009 | Heap | 2009/0118952 A1 | 5/2009 | Heap |
| 2009/0118936 | A1 | 5/2009 | Heap | 2009/0118954 A1 | 5/2009 | Wu |
| 2009/0118937 | A1 | 5/2009 | Heap | 2009/0118957 A1 | 5/2009 | Heap |
| 2009/0118938 | A1 | 5/2009 | Heap | 2009/0118962 A1 | 5/2009 | Heap |
| 2009/0118939 | A1 | 5/2009 | Heap | 2009/0118963 A1 | 5/2009 | Heap |
| 2009/0118940 | A1 | 5/2009 | Heap | 2009/0118964 A1 | 5/2009 | Snyder |
| 2009/0118941 | A1 | 5/2009 | Heap | 2009/0118969 A1 | 5/2009 | Heap |
| 2009/0118942 | A1 | 5/2009 | Hsieh | 2009/0118971 A1 | 5/2009 | Heap |
| 2009/0118943 | A1 | 5/2009 | Heap | 2009/0118999 A1 | 5/2009 | Heap |
| 2009/0118944 | A1 | 5/2009 | Heap | 2009/0144002 A1 | 6/2009 | Zettel |
| 2009/0118945 | A1 | 5/2009 | Heap | | | |

* cited by examiner

US 8,219,303 B2

METHOD FOR OPERATING AN INTERNAL COMBUSTION ENGINE FOR A HYBRID POWERTRAIN SYSTEM

CROSS REFERENCE TO RELATED APPLICATIONS

This application claims the benefit of U.S. Provisional Application No. 60/985,642 filed on Nov. 5, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures include torque-generative devices, including internal combustion engines and torque machines, which transfer torque through a transmission device to an output member. One exemplary hybrid powertrain includes a two-mode, compound-split, electromechanical transmission which utilizes an input member for receiving tractive torque from a prime mover power source, preferably an internal combustion engine, and an output member. The output member can be operatively connected to a driveline for a motor vehicle for transferring tractive torque thereto. Electric machines, operative as motors or generators, generate a torque input to the transmission, independently of a torque input from the internal combustion engine. The electric machines may transform vehicle kinetic energy, transferred through the vehicle driveline, to electrical energy that is storable in an electrical energy storage device. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

During an engine start, compression torque pulses can generated in individual engine cylinders and transmitted to a transmission torque damper and an engine block, which may result in objectionable vibrations reaching the vehicle operator, especially at resonant frequencies for the powertrain and various driveline components. The compression torque pulses can disturb engine output torque and can result in objectionable audible noise. The magnitude of the vibration can be sufficiently great enough to overwhelm feedback damping control systems.

A control scheme responsive to vibrations caused during starting of an internal combustion engine is described for an engine that is an element of a hybrid powertrain system.

SUMMARY

A hybrid powertrain system includes an internal combustion engine operatively connected to a second torque machine to transmit torque to an output member. A method for operating the hybrid powertrain system includes monitoring an operator torque request, determining an output torque command based upon the operator torque request, commanding a transition between an engine-off state and an engine-on state, monitoring an engine crank angle, spinning the engine unfueled, estimating cylinder pressure based upon the engine crank angle during the spinning of the engine, predicting a cylinder pulse torque based upon the cylinder pressure, determining a cancellation torque for the second torque machine based upon the predicted cylinder pulse torque, and controlling motor torque output from the second torque machine based upon the cancellation torque and the output torque command.

BRIEF DESCRIPTION OF THE DRAWINGS

One or more embodiments will now be described, by way of example, with reference to the accompanying drawings, in which.

DETAILED DESCRIPTION

Figure 1:
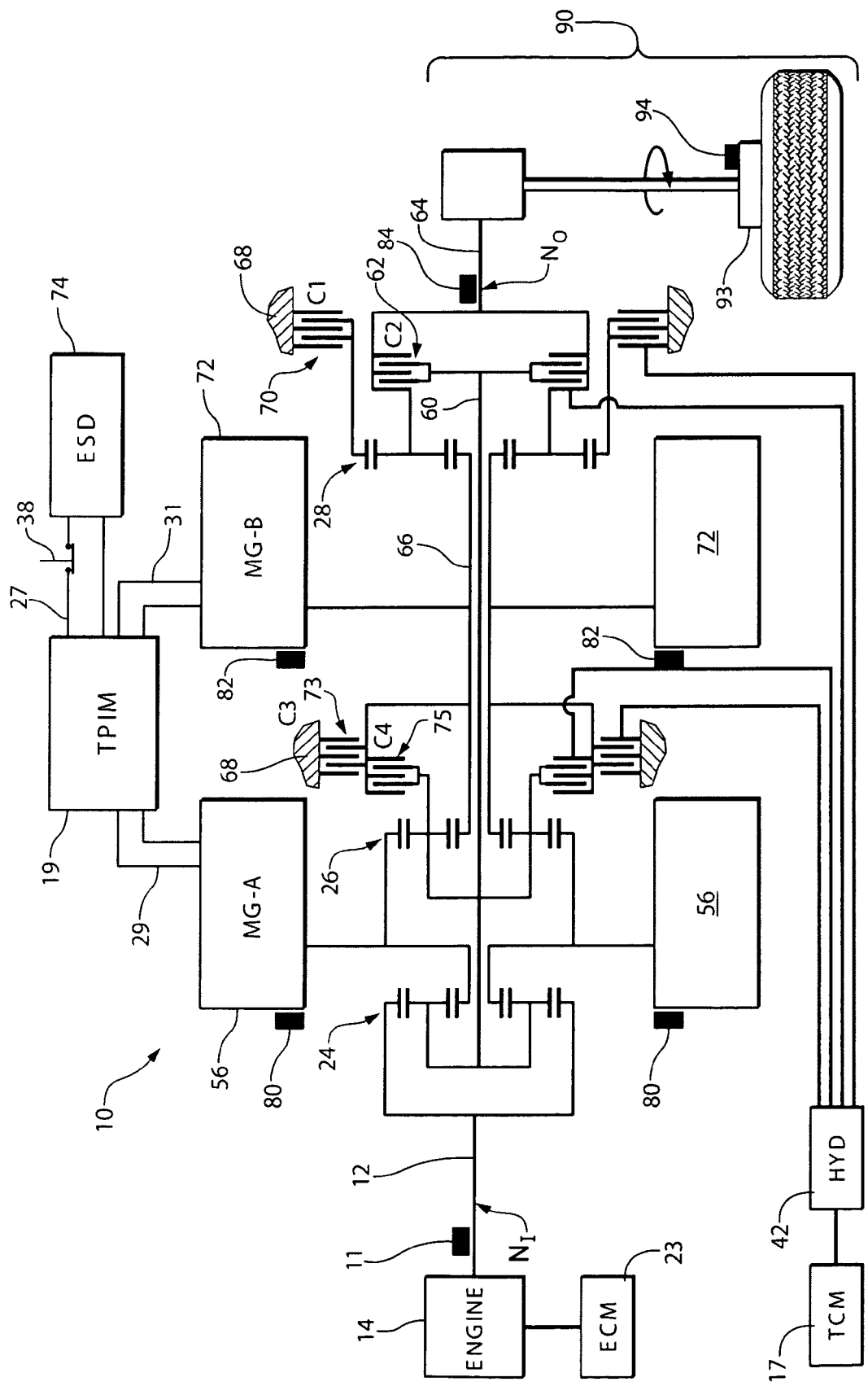
FIG. 1 is a schematic diagram of an exemplary hybrid powertrain, in accordance with the present disclosure.
Figure 2:
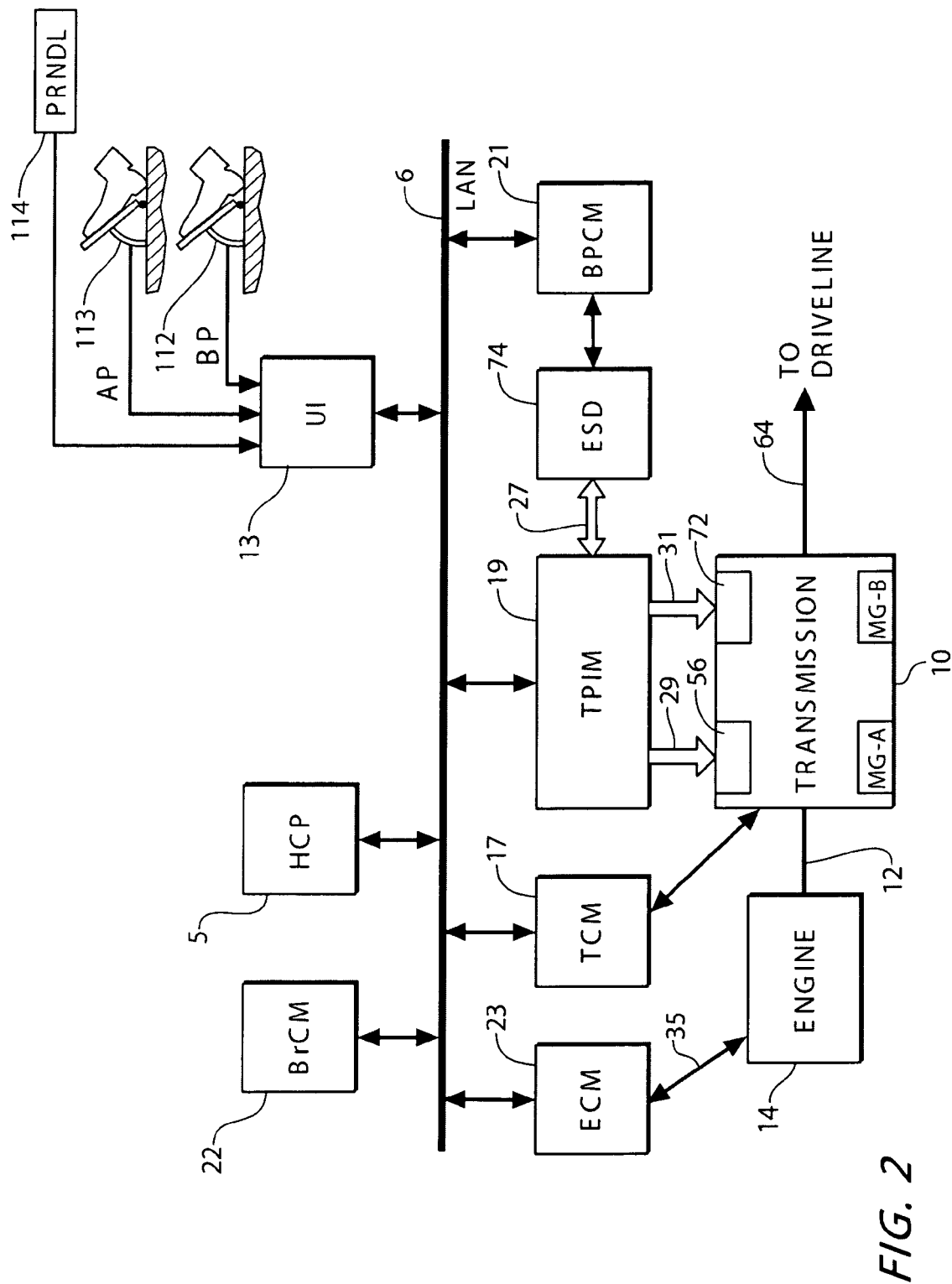
FIG. 2 is a schematic diagram of an exemplary architecture for a control system and hybrid powertrain, in accordance with the present disclosure.

Referring now to the drawings, wherein the showings are for the purpose of illustrating certain exemplary embodiments only and not for the purpose of limiting the same, FIGS. 1 and 2 depict an hybrid powertrain. The exemplary hybrid powertrain in accordance with the present disclosure is depicted in FIG. 1, comprising a two-mode, compound-split, electromechanical hybrid transmission 10 operatively connected to an engine 14 and torque generating machines comprising first and second electric machines ('MG-A') 56 and ('MG-B') 72. The engine 14 and torque machines comprising first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input member 12, and can be either a spark-ignition or a compression-ignition engine. The engine 14 includes a crankshaft (not shown) operatively coupled to the input member 12 of the transmission 10. A rotational speed sensor 11 monitors rotational speed of the input member 12. Power output from the engine 14, comprising rotational speed and engine torque, can differ from the input speed $N_I$ and the input torque $T_I$ to the transmission 10 due to placement of torque-consuming components on the input member 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input member 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input member 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

Figure 3:
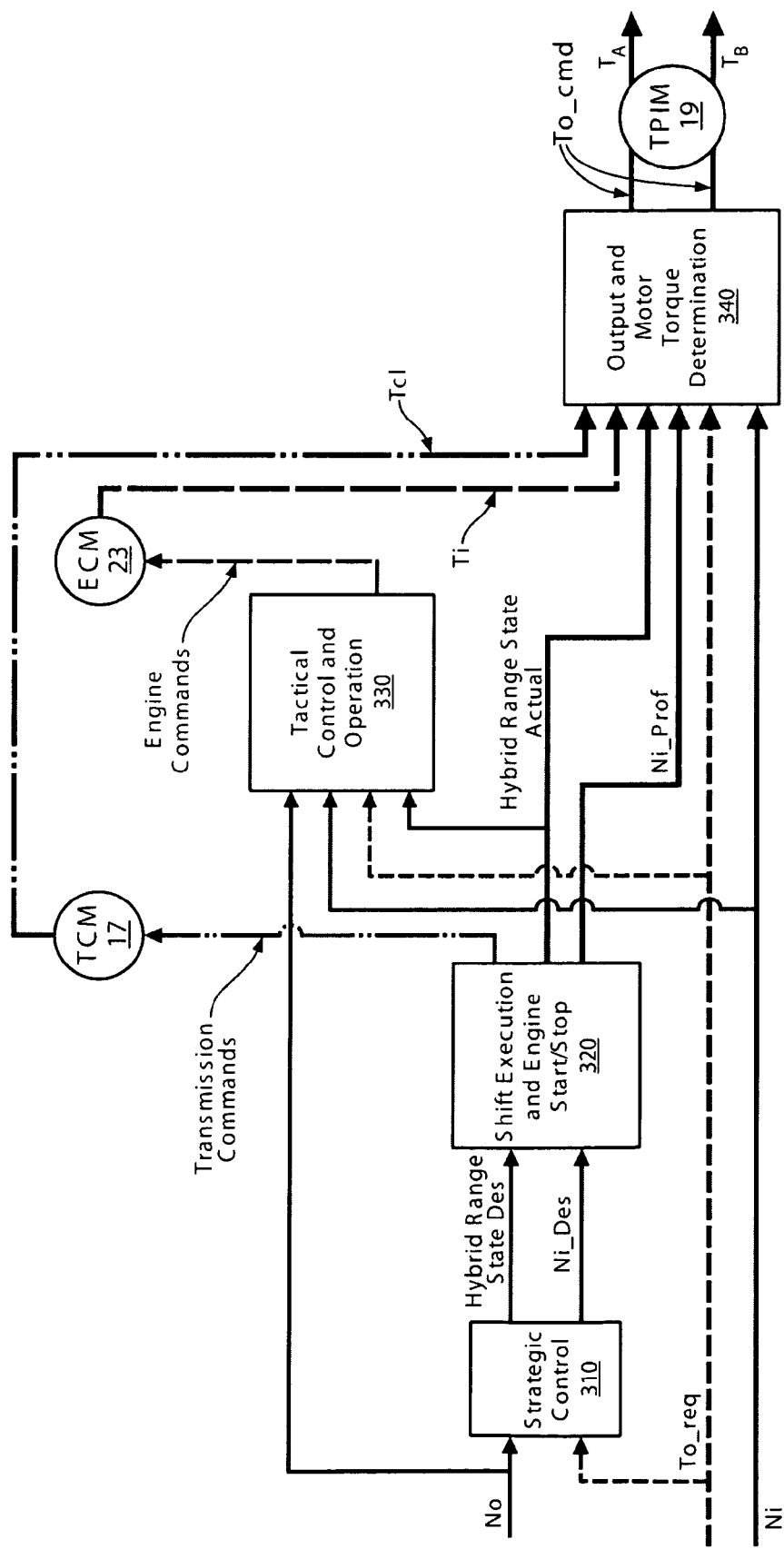
FIGS. 3 and 4 are schematic flow diagrams of a control system architecture for controlling and managing torque in a hybrid powertrain system in accordance with the present disclosure.

FIG. 3 shows a control system architecture for controlling and managing torque and power flow in a powertrain system having multiple torque generative devices, described hereinbelow with reference to the hybrid powertrain system shown in FIGS. 1 and 2, and residing in the aforementioned control modules in the form of executable algorithms and calibrations. The control system architecture can be applied to any powertrain system having multiple torque generative devices, including, e.g., a hybrid powertrain system having a single electric machine, a hybrid powertrain system having multiple electric machines, and non-hybrid powertrain systems.

The control system architecture of FIG. 3 depicts a flow of pertinent signals through the control modules. In operation, the operator inputs to the accelerator pedal 113 and the brake pedal 112 are monitored to determine the operator torque request ('To_req'). Operation of the engine 14 and the transmission 10 are monitored to determine the input speed ('Ni') and the output speed ('No'). A strategic optimization control scheme ('Strategic Control') 310 determines a preferred input speed ('Ni_Des') and a preferred engine state and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle.

The outputs of the strategic optimization control scheme 310 are used in a shift execution and engine start/stop control scheme ('Shift Execution and Engine Start/Stop') 320 to command changes in the transmission operation ('Transmission Commands') including changing the operating range state. This includes commanding execution of a change in the operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the output speed, the input speed, and the operator torque request and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state.

A clutch torque ('Tcl') for each clutch is estimated in the TCM 17, including the presently applied clutches and the non-applied clutches, and a present engine input torque ('Ti') reacting with the input member 12 is determined in the ECM 23.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net commanded output torque to the output member 64 of the transmission 10 that meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 to react with the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 to react with the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

Figure 4:
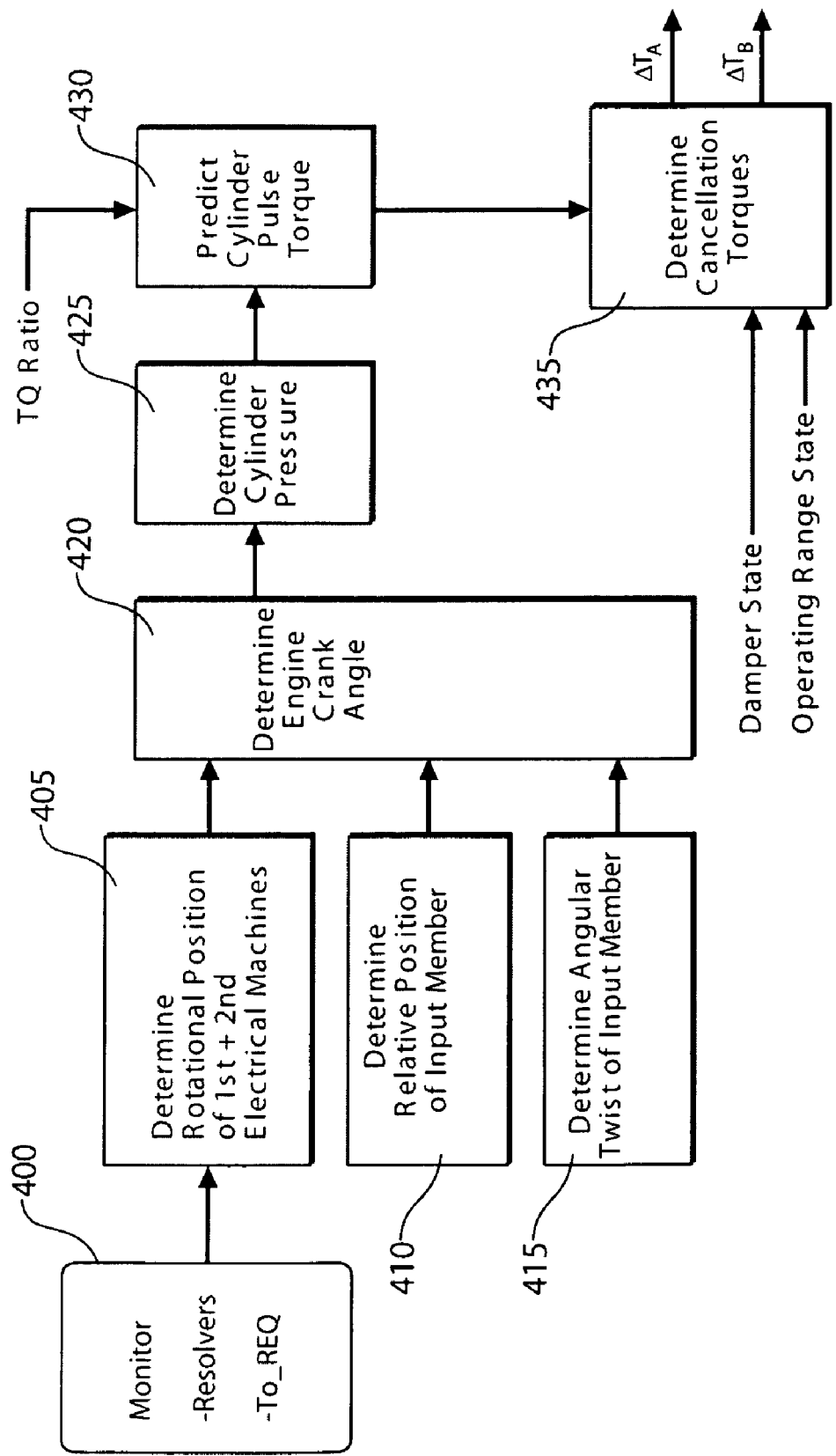

FIG. 4 shows a control flow chart for controlling operation of a hybrid powertrain system including an internal combustion engine and a second torque machine in response to an output torque command to a driveline. This includes compensating for compression torque pulses, i.e., cylinder torque pulses transmitted to the input member 12 and caused by compression of engine pistons in cylinders during rotation of the engine 14 when it is unfueled and unfired that can occur during engine starting and engine stopping. Controlling operation of the hybrid powertrain system includes monitoring signal inputs from the resolvers 80 and 82 and monitoring an operator torque request (Monitor-Resolvers-$T_{O\_REQ}$') (400). An output torque command can be determined based upon the operator torque request. A command to transition the engine from an engine-off state to an engine-on state is generated, e.g., when the control system commands starting the engine 14 during ongoing powertrain operation. When there is a command to start the engine, an engine crank angle is determined (420), and the second torque machine is controlled to spin the engine 14 unfueled and unfired. Cylinder pressure can be determined based upon the engine crank angle during the spinning of the engine 14 unfueled and unfired (425). A cylinder pulse torque for each cylinder of the engine 14 is determined based upon the cylinder pressure (430). A cancellation torque for operating the second torque generating machine that is spinning the engine 14 is determined (435). The second torque machine is controlled to a torque output that is determined based upon the cancellation torque and the output torque command. This operation is now described with reference to the powertrain system described hereinabove in FIGS. 1, 2, and 3. The concepts described herein apply to powertrain systems having an internal combustion engine that can shut down and stop rotating during ongoing powertrain operation, including any powertrain having an engine and a second torque machine that can be controlled to spin the engine 14 and may be further operative to transmit torque to a driveline.

The engine crank angle 420 can be determined based upon rotational positions of respective ones of the first and second electric machines 56 and 72, a relative position of the input member 12, and an angular twist of the input member 12 and the torque damper device 20. The method comprises monitoring signal inputs from the resolvers 80 and 82 (400), determining the rotational position of the first and second electric machines 56 and 72 (405), determining the relative position of the input member 12 (410), and determining the angular twist of the input member 12 (415). The engine crank angle is correlated to engine crankshaft position and a piston position, e.g., by a TDC position of a nominal first cylinder.

Rotational positions of the first and second electric machines 56 and 72 are determined based upon signal inputs from the resolvers 80 and 82. Each resolver stator comprises a series of inductive coils assembled thereon which receive an electrical signal from either the MCPA 33 or the MCPB 34, and a pair of sensing coils which provide an electrical signal output. The resolver rotor comprises a device having a plurality of lobes, located on the outer circumference. In operation, the resolver rotor rotates with the motor rotor. The sensing coils return a signal to either the MCPA 33 or the MCPB 34 at the same frequency as the electrical signal output and having a voltage level that is dependent upon the proximity of the lobed resolver rotor to the resolver stator.

The resolvers 80 and 82 operate by sensing relative position and motion of the resolver rotor rotating within the resolver stator. The control system interprets the signal returned through the resolver stator to determine rotor position, using e.g., a variable reluctance device. The exemplary resolver assemblies 80 and 82 for MA and MB measure electrical rotational angles $\theta_A$ and $\theta_B$ that range from 0-360° of electrical rotation for each pair of poles of the stators. In the system described, a 10-pole resolver system measures 360° of electrical rotation for each 72° of mechanical shaft rotation, which translates to five electrical degrees of rotation for each mechanical degree of rotation. Each resolver generates an excitation frequency and measures feedback from electric signals across the resolver, permitting each resolver to measure position substantially immediately from start of rotation, without a need to synchronize.

As one skilled in the art will appreciate, rotational position of the input member 12 can be determined based upon the rotational positions of the first and second electric machines 56 and 72, and known mechanical gear ratios of the planetary gears of the transmission 10 and the quantity of lobes of the resolvers 80 and 82. The angular twist across the input member 12 and the torque damper device 20 can be determined based upon physical characteristics of the system.

The engine crank angle can then be expressed as follows:

$$\theta_E = \theta_I + \theta_T - (\theta_A * K1) - (\theta_B * K2)$$

wherein $\theta_E$ represents the engine crank angle, $\theta_I$ represents the rotational position of the input member 12, $\theta_T$ represents the angular twist across the input member 12 and the torque damper device 20, $\theta_A$ represents the rotational position of the first electric machine 56, $\theta_B$ represents the rotational position of the second electric machine 72, and K1 and K2 are parametric values representing known mechanical gear ratios of the planetary gears of the transmission 10 and the quantity of lobes of the resolvers 80 and 82.

Cylinder pulse torque on an unfired cylinder may be predicted using one of multiple methods. One method comprises predicting cylinder pulse torque based upon the engine crank angle and cylinder pressure. The cylinder pressure is based upon compression pulses generated by crankshaft rotation. Each cylinder pulse torque is predicted by multiplying a torque ratio ('TQ ratio') by the cylinder pressure. The torque ratio is determined for each cylinder as a function of crank angle, which encompasses changes in cylinder geometry and cylinder friction.

The cylinder pressure in an unfired cylinder may be estimated as follows:

$$(P*V)^{1.3} = \text{constant}$$

wherein P is cylinder pressure which can be determined based upon intake air mass and temperature, and
V is cylinder volume.

After ignition, the cylinder pressure can be estimated as an adiabatic compression, i.e., having minimal or no heat transfer. Cylinder pressure for the unfired cylinder with intake and exhaust valves closed can be estimated generally by Eq. 1:

$$P2 = P1*(V1/V2)^{1.3} \qquad [1]$$

wherein P2 represents current cylinder pressure, and
P1 represents cylinder pressure determined at a most recently occurring valve transition,
V1 represents combustion chamber volume at a most recently previously occurring valve transition, and
V2 represents current combustion chamber volume determined based upon the engine crank angle and piston position.

When the exhaust valves are open P2 is determined based upon a first-order lag filter leading to atmospheric pressure, assuming the airflow speeds are sufficiently low that exhaust backpressure is at ambient atmospheric pressure. When the intake valves are open, P2 is determined based upon a first-order lag filter leading to manifold pressure, assuming the airflow speeds are sufficiently low enough that exhaust backpressure is fixed at atmospheric pressure for all calculations.

When the intake and exhaust valves are closed, necessary data is calculated before the valves close. For forward engine rotation, the intake valve is closing, P1 is initialized to manifold pressure (MAP) and V1 is calculated by using the angle for intake valve closing. For reverse engine rotation, the exhaust valve is closing, P1 is initialized to atmospheric pressure and V1 is calculated by using the angle for exhaust valve opening. Preferably the combustion chamber volumes (V1 and V2) are determined based upon engine crank angle and stored in a lookup table indexed by the combustion chamber volume and corresponding to engine crank angle. A correction is also made for cylinder leakage and blow-by past the piston, which is critical for low engine speeds to achieve correct initial conditions. The correction comprises modifying the value for P1 to $P1_{adj}$ to account for losses proportional to the pressure difference between P1 and P2, whereby $P1_{adj}$ is given by Eq. 2:

$$P1_{adj} = P1 - K*(P2 - P_{atm}) \qquad [2]$$

wherein K is a predetermined system-specific filter coefficient, i.e., a gain factor.

Each opening and closing event of the intake and exhaust valves is modeled as discrete, i.e., the valve is either open or closed. When one of the valves is transitioned to open, the cylinder pressure is set to one of either manifold pressure (MAP) or exhaust pressure, $P_{EXHAUST}$, which is assumed to be atmospheric pressure, as shown in Eq. 3:

$$P2 = P1*(1-K) + P_{EXHAUST}*K; \qquad [3]$$

wherein P2 indicates current cylinder pressure, and
P1 indicates cylinder pressure determined at the most recently occurring valve transition.

Each valve timing event requires accurate timing, preferably less than five crank angle degrees of rotation. This includes speed-based corrections which are made to account for airflow dynamics and pump-down and leakage of valve lifters.

The effect of valve position and valve timing on cylinder pressure is also modeled for inclusion in the control scheme. The valve transition events comprise intake valve opening (IVO), intake valve closing (IVC), exhaust valve opening (EVO) and exhaust valve closing (EVC). With regard to modeling cylinder pressure, crank angle at which IVC occurs is critical, as this initiates engine operation with all the valves closed when the engine is rotating in a positive direction, and the combustion chamber is substantially a closed chamber with pressure varying based upon volume of the combustion chamber. The control scheme monitors crank angle for each cylinder and assigns a ValveState flag which is set to one of IVO, EVO, and, Valves Closed (IVC and EVC). Valve overlap is ignored because of the minor influence on crank torque.

At low and zero engine speed, hydraulic valve lifters tend to leak down on any valves that are in an open state, until either the valve closes or the lifter fully collapses. As engine speed increases the velocity of air exiting the valve increases. Therefore, the valve must open further for similar pressure drop. This is addressed using computational flow dynamics simulations developed off-line executed with actual valve dynamics to assess the maximum cylinder pressure achieved at piston top-dead-center.

The torque ratio is determined based upon crank angle, and is a function of cylinder pressure (in kPa) determined at each crank angle. Torque ratio parameters are predetermined and include factors related to cylinder geometry and piston friction. A factor for torque ratio can be determined for each cylinder as a function of crank angle. Thus, cylinder pulse torque for a given cylinder comprises the estimated cylinder pressure multiplied by the torque ratio. A total predicted cylinder pulse torque, i.e., an engine pulse torque, is a sum of the predicted cylinder pulse torque values for each of the cylinders.

Cancellation torques are determined for the first and second electrical machines 56 and 72 based upon the predicted cylinder pulse torques, a damper state, and an operating range state. The damper state comprises one of a locked state and unlocked state. The operating range state comprises one of mode M1 and neutral during starting in one embodiment. Cancellation torque mitigates objectionable audible noise, objectionable vibrations reaching the vehicle operator including vibrations that overwhelm feedback damping control system cause by the predicted cylinder pulse torques. Cancellation torque mitigates the cylinder pulse torques by providing substantially reciprocal torque into the transmission 10. The cancellation torques are executed in the hybrid powertrain as desired changes in the motor torques for the first and second electric machines 56 and 72.

For engine starts in the continuously variable mode M1, the motor torques for the first and second electrical machines 56 and 72 are determined based upon the torque relationship between acceleration of the input member 12, acceleration of the output member 64, input torque, and an operator torque request. The relationship is defined as:

$$\begin{bmatrix} \Delta T_A \\ \Delta T_B \end{bmatrix} = [A_{M1}] \begin{bmatrix} T_{I\_CL} \\ T_{O\_CL} \\ \dot{N}_I \\ \dot{N}_O \end{bmatrix} \quad [1]$$

wherein $T_A$ and $T_B$ represent the motor torques for first and second electric machines 56 and 72,
$T_I$ represents the input torque from engine 14,
$T_O$ represents the operator torque request,
$\dot{N}_I$ represents acceleration of the input member 12,
$\dot{N}_O$ represents acceleration of the output member 64, and
$A_{M1}$ represents a 2×4 matrix of known parametric values based upon hardware gear and shaft interconnections determined for the specific application, the specific damper state, and the M1 operating range state.

To compensate for the cylinder pulse torques the predicted engine pulse torque and the output pulse torques are included in Eq. 1 for the M1 operating range state. The cancellation torques are determined for the M1 operating range state based upon the predicted engine pulse torque, the output pulse torques, acceleration of the input member 12, acceleration of the output member 64, known parametric values for the specific application hardware gear and shaft interconnections, and the damper state. The cancellation torques for the first and second electrical machines 56 and 72 are determined using the following equation:

$$\begin{bmatrix} \Delta T_A \\ \Delta T_B \end{bmatrix} = [A_{M1}] \begin{bmatrix} T_{I\_CL} \\ T_{O\_CL} \\ \dot{N}_I \\ \dot{N}_O \end{bmatrix} \quad [2]$$

wherein $\Delta T_A$ and $\Delta T_B$ represent desired changes in the motor torques for first and second electric machines 56 and 72,
$T_{I\_CL}$ represents the predicted engine pulse torque,
$T_{O\_CL}$ represents an output pulse torque,
$\dot{N}_I$ represents acceleration of the input member 12,
$\dot{N}_O$ represents acceleration of the output member 64, and
$A_{M1}$ represents the 2×4 matrix of known parametric values based upon hardware gear and shaft interconnections determined for the specific application, the specific damper state, and the M1 operating range state.

For engine starts beginning in the neutral operating range state, the motor torques for the first and second electrical machines 56 and 72 are determined based upon a relationship between acceleration of the input member 12, acceleration of the output member 64, input torque, the operator torque request, and a change rate of the speed of the C1 70 clutch. The relationship is defined as:

$$\begin{bmatrix} T_A \\ T_B \\ T_O \end{bmatrix} = [B_N] \begin{bmatrix} T_I \\ \dot{N}_I \\ \dot{N}_O \\ \dot{N}_{C1} \end{bmatrix} \quad [3]$$

wherein $T_A$ and $T_B$ represent the motor torques for first and second electric machines 56 and 72,
$T_I$ represents the input torque from engine 14,
$T_O$ represents the operator torque request,
$\dot{N}_I$ represents acceleration of the input member 12,
$\dot{N}_O$ represents acceleration of the output member 64,
$\dot{N}_{C1}$ the represents the change rate of the speed of the C1 70 clutch, and
$B_N$ represents a 3×4 matrix of known parametric values based upon hardware gear and shaft interconnections determined for the specific application, the specific damper state, and the neutral operating range state.

To compensate for the cylinder pulse torques the predicted engine pulse torque and the output pulse torques are included in Eq. 3 for the neutral operating range state. The cancellation torques are determined for the neutral operating range state based upon the predicted engine pulse torque, the output pulse torques, acceleration of the input member 12, acceleration of the output member 64, known parametric values for the specific application hardware gear and shaft interconnections, and the damper state. The cancellation torques for the first and second electrical machines 56 and 72 are determined using the following equation:

$$\begin{bmatrix} \Delta T_A \\ \Delta T_B \\ T_{O\_CL} \end{bmatrix} = [B_N] \begin{bmatrix} T_{I\_CL} \\ \dot{N}_I \\ \dot{N}_O \\ \dot{N}_{C1} \end{bmatrix} \quad [4]$$

wherein $\Delta T_A$ and $\Delta T_B$ represent desired changes in the motor torques for first and second electric machines 56 and 72,
$T_{I\_CL}$ represents the predicted engine pulse torque,
$T_{O\_CL}$ represents an output pulse torque,
$\dot{N}_I$ represents acceleration of the input member 12,
$\dot{N}_O$ represents acceleration of the output member 64,
$\dot{N}_{C1}$ the represents the change rate of the speed of the C1 70 clutch, and
$B_N$ is a 3×4 matrix of known parametric values based upon hardware gear and shaft interconnections determined for the specific application, the specific damper state, and the neutral operating range state.

Additionally, weighted coefficients may be included for the desired changes in the motor torques for first and second electric machines 56 and 72 in Eq. 2. The weighted coefficients may be used to effect proportional changes in motor torques from the first and second electrical machines 56 and 72, e.g., $0.8*\Delta T_A$ and $0.2*\Delta T_B$ in Eqs. 2 and 4.

The output and motor torque determination scheme 340 is executed to determine the preferred output torque from the powertrain ('To_cmd'), including determining the motor torque commands ('$T_A$', '$T_B$') to transfer the commanded output torque to the output member 64 of the transmission 10 that meets the operator torque request. During an engine start event, prior to firing the engine 14, the motor torque commands for the first and second electric machines 56 and 72 are adjusted based upon the desired changes in the motor torques for first and second electric machines 56 and 72 determined for the selected operating range state of neutral and M1 to crank the engine 14. The desired changes in the motor torques for first and second electric machines 56 and 72 cancel the cylinder pulse torques from the engine 14 occurring prior to firing the engine, thereby reducing objectionable audible noise and objectionable vibrations within the hybrid powertrain system. The method described herein can be applied during an engine shut off event, subsequent to stopping fueling of the engine 14. This operation is preferably executed every loop cycle during which the output and motor torque determination scheme 340 is executed prior to firing the engine.

Figure 5:
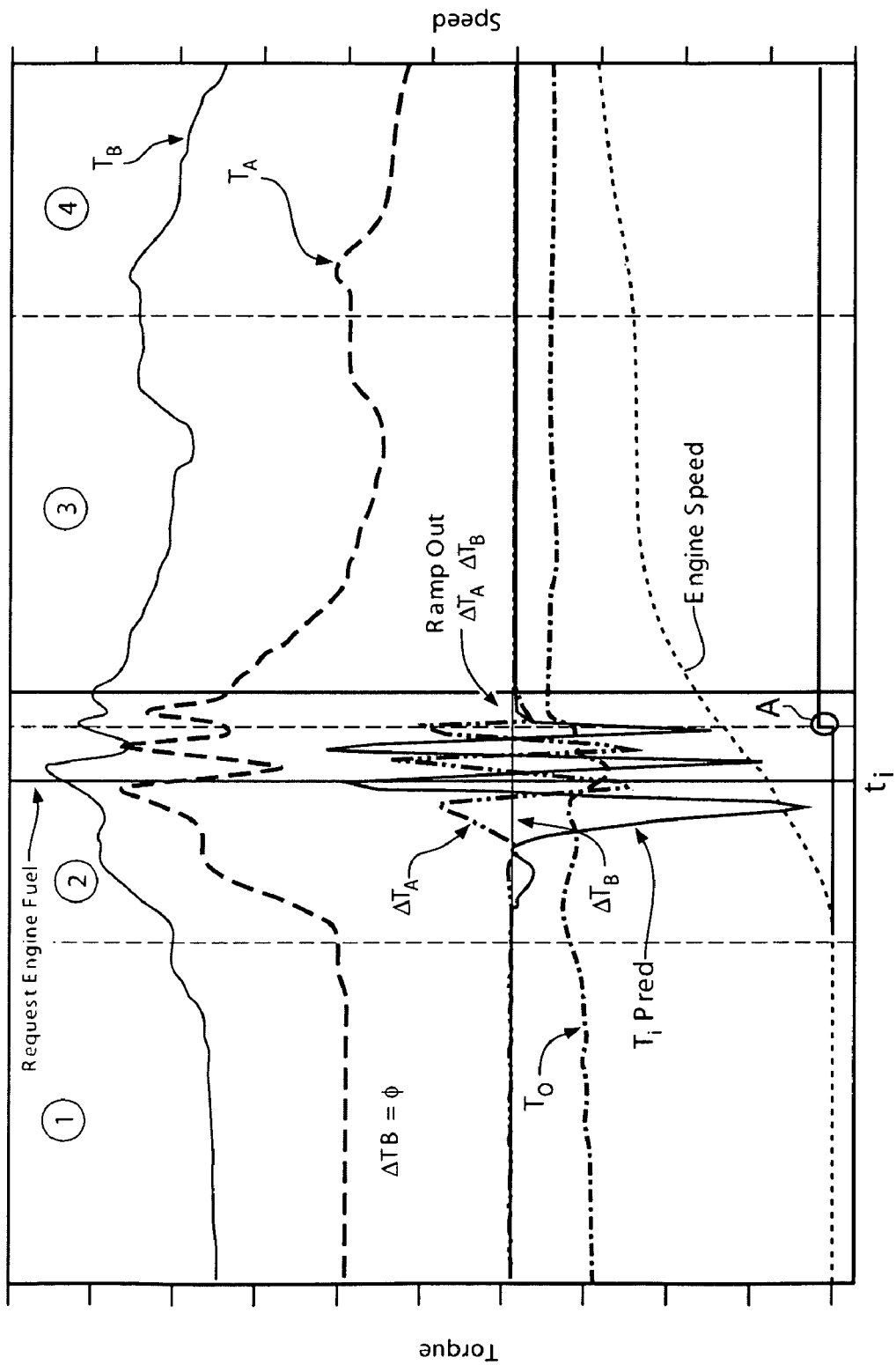
FIG. 5 is a datagraph, in accordance with the present disclosure.

FIG. 5 is a datagraph that shows time-based results from an exemplary powertrain system during an engine start. Region 1 depicts powertrain operations with the engine 14 OFF, unspun, and unfueled. The predicted engine pulse torque ('Ti Pred') is substantially zero, and motor torques $T_A$ and $T_B$ and the output torque $T_O$ are stable. Region 2 depicts powertrain operations with the engine 14 spun by the first electric machine 56, indicated by increased motor torques $T_A$ and $T_B$. The engine 14 is unfueled. As the first electrical machine 56 begins to spins the engine 14 the predicted engine pulse torque decreases substantially. Cancellation torque ($\Delta T_A$) is calculated and transmitted to the transmission 10 by the first electric machine 56 in this example to cancel the engine pulse torque. Cancellation torque by the second electric machine 72 is held at zero. The engine 14 is fueled at time ti and subsequently fired, and the cancellation torque is ramped out. Output torque ('$T_O$') is affected, but not substantially. Region 3 depicts powertrain operations with the engine 14 spinning and fueled. The engine cylinder pulse torque decreases to substantially zero and the applied cancellation torque is decreased to zero. Region 4 depicts powertrain operations with the engine 14 ON, i.e., fueled and fired.

Figure 6:
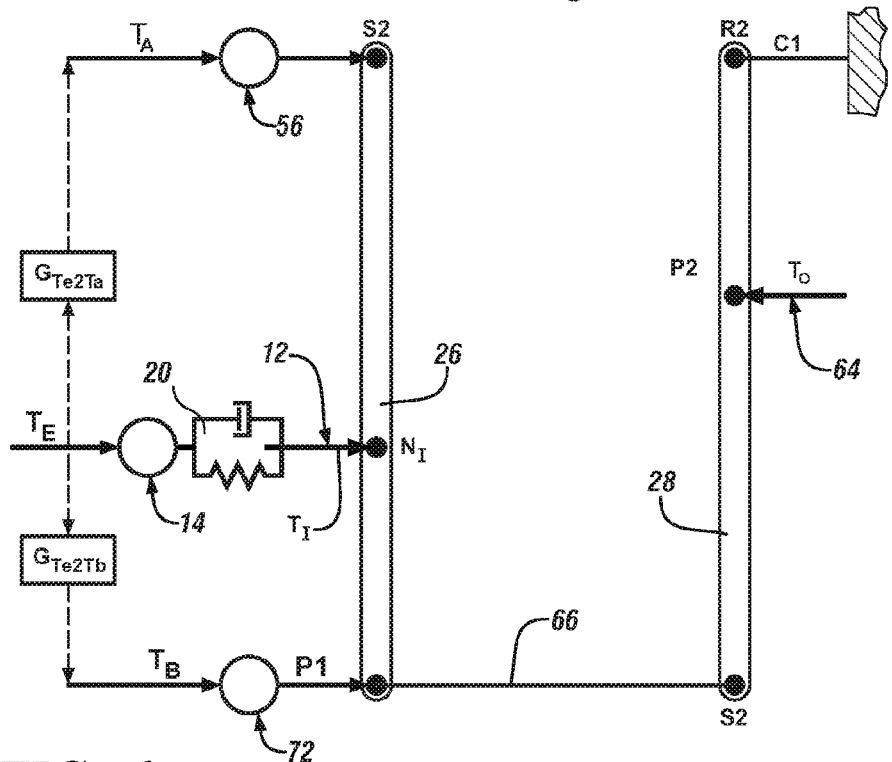
FIGS. 6 and 7 are schematic diagrams, in accordance with the present disclosure.

FIG. 6 shows a lever diagram depicting operating the exemplary powertrain system with the transmission 10 operating in the Mode 1 operating range state, including applying of the cancellation torques. Torque inputs from the engine ('$T_E$') and the first and second electric machines 56 and 72 ('$T_A$' and '$T_B$') are inputs to the second planetary gears 26 at nodes N1, S1, and P1, and include damper 20 which can cause the engine torque to become an input torque ('$T_I$') that differs from the engine torque. The torque inputs are transferred via sleeve shaft 66 to the third planetary gears 28, which are grounded at node R2 by the first torque transfer clutch C1 70, and connected to the output member 64 at Node P2. The cancellation torques, determined as described hereinabove and depicted as '$G_{Te2Ta}$' and '$G_{Te2Tb}$' from the first and second electric machines 56 and 72 are applied through the second planetary gear set 26 thereby substantially reducing the engine pulse torque out of the output member 64.

Figure 7:
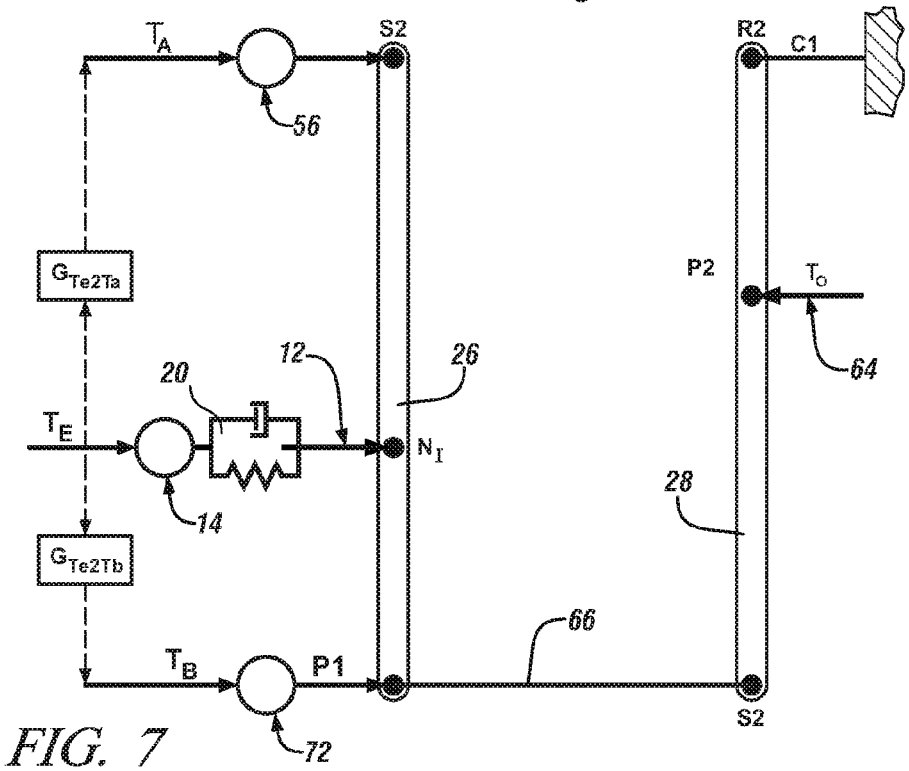

FIG. 7 shows a lever diagram depicting operating the exemplary powertrain system with the transmission 10 operating in the neutral operating range state, including applying of the cancellation torques. Torque inputs from the engine ('$T_E$') and the first and second electric machines 56 and 72 ('$T_A$' and '$T_B$') are inputs to the second planetary gears 26 at nodes N1, S1, and P1, and include damper 20 which can cause the engine torque to become an input torque ('$T_I$') that differs from the engine torque. The torque inputs are transferred via sleeve shaft 66 to the third planetary gears 28, which is connected to the output member 64 at Node P2. Clutch C1 70 is open. The cancellation torques, determined as described hereinabove and depicted as '$G_{Te2Ta}$' and '$G_{Te2Tb}$' from the first and second electric machines 56 and 72 are applied through the second planetary gear set 26 thereby substantially reducing the engine pulse torque out of the output member 64.

It is understood that modifications are allowable within the scope of the disclosure including powertrain systems including diesel engines, powertrain systems including spark-ignition engines, and powertrain systems including auto-ignition combustion engines. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for operating a hybrid powertrain system including an internal combustion engine operatively connected to first and second torque machines to transmit torque to an output member, the method comprising:
   monitoring an operator torque request;
   determining an output torque command based upon the operator torque request;
   commanding a transition between an engine-off state and an engine-on state;
   monitoring an engine crank angle;
   operating the first torque machine to spin the engine unfueled;
   estimating cylinder pressure based upon the engine crank angle during the spinning of the engine;
   predicting a cylinder pulse torque based upon the cylinder pressure;
   determining a cancellation torque for the first torque machine based upon the predicted cylinder pulse torque; and
   controlling the motor torque output of the first torque machine in response to both the cancellation torque and the output torque command and controlling the motor torque output of the second torque machine only in response to the output torque command.

2. The method of claim 1, further comprising predicting the cylinder pulse torque based upon the estimated cylinder pressure and a torque ratio.

3. The method of claim 1, wherein determining the cancellation torque for the first torque machine based upon the predicted cylinder pulse torque comprises determining the cancellation torque for the first torque machine during the spinning of the engine unfueled.

4. The method of claim 1, further comprising:
   fueling the engine and decreasing the cancellation torque during spinning of the engine subsequent to the fueling of the engine.

5. The method of claim 1, wherein controlling the motor torque output of the first torque machine based upon the cancellation torque and the output torque command and controlling the motor torque output of the second torque machine only in response to the output torque command occurs during the spinning of the engine unfueled and during spinning of the engine fueled prior to firing the engine.

6. The method of claim 1, wherein commanding the transition between the engine-off state and the engine-on state comprises commanding the transition from the engine-off state to the engine-on state.

7. The method of claim 1, wherein commanding the transition between the engine-off state and the engine-on state comprises commanding the transition from the engine-on state to the engine-off state.

8. The method of claim 1, further comprising the hybrid powertrain system including the internal combustion engine operatively connected to the first and second torque machines to transmit torque to the output member via a transmission; and
   wherein controlling the motor torque output of the first torque machine in response to both the cancellation torque and the output torque command and controlling the motor torque output of the second torque machine only in response to the output torque command comprises operating the transmission in a neutral mode and controlling the motor torque output of the first torque machine in response to both the cancellation torque and the output torque command and controlling the motor torque output of the second torque machine only in response to the output torque command.

* * * * *